(12) United States Patent
Petrenko

(10) Patent No.: US 6,427,946 B1
(45) Date of Patent: Aug. 6, 2002

(54) SYSTEMS AND METHODS FOR MODIFYING ICE ADHESION STRENGTH

(75) Inventor: Victor Petrenko, Lebanon, NH (US)

(73) Assignee: Trustees of Dartmouth College, Hanover, NH (US)

(*) Notice: Subject to any disclaimer, the term of this patent is extended or adjusted under 35 U.S.C. 154(b) by 0 days.

(21) Appl. No.: 09/857,952
(22) PCT Filed: Oct. 26, 1999
(86) PCT No.: PCT/US99/25124
§ 371 (c)(1),
(2), (4) Date: Jun. 12, 2001
(87) PCT Pub. No.: WO00/24634
PCT Pub. Date: May 4, 2000

Related U.S. Application Data
(60) Provisional application No. 60/105,782, filed on Oct. 27, 1998.

(51) Int. Cl.$^7$ .............................................. B64D 15/00
(52) U.S. Cl. ............................ 244/134 R; 244/134 D
(58) Field of Search ................. 244/134 R, 134 D, 244/134 F; 219/770, 772, 213; 324/693, 694

(56) References Cited

U.S. PATENT DOCUMENTS

| | | |
|---|---|---|
| 2,870,311 A | 1/1959 | Greenfield et al. |
| 4,330,703 A | 5/1982 | Horsman et al. |
| 4,897,597 A | 1/1990 | Whitener. |
| 5,398,547 A | 3/1995 | Geraldi et al. |
| 5,551,288 A | 9/1996 | Geraldi et al. |
| 6,027,075 A | * 2/2000 | Petrenko |

* cited by examiner

Primary Examiner—Charles T. Jordan
Assistant Examiner—T. Dinh
(74) Attorney, Agent, or Firm—Curtis A. Vock; Lathrop & Gage L.C.

(57) ABSTRACT

The invention includes system for modifying ice adhesion strength of ice adhered to an object. The system includes an electrode that is electrically insulated from the object and a DC source, e.g., a battery, coupled to the object and the electrode. The source generates a DC bias to an interface between the ice and the object when the ice completes the circuit. The object is conductive or is doped as a semiconductor so that the DC bias applies a voltage to the interface which modifies the ice adhesion strength selectively as compared to the ice adhesion strength with substantially zero bias voltage at the interface. The strength can be increased or decreased relative to its static state (i.e., the state without applied voltage). In this manner, ice such as ice on an aircraft wing can be removed with less work. The system preferably includes an electrically insulating material disposed between the object and the electrode; the insulating material is substantially conformal to the object and the electrode. In most applications, the electrode includes a grid electrode shaped to conform to a surface of the object and each point of the grid electrode is in electrical contact with the source. Accordingly, a grid insulator is generally disposed between the object and the grid electrode. The invention of one embodiment incorporates porous materials to selectively dope the ice on a surface; and the invention of another embodiment incorporates self assembling monolayers to reduce the strength of hydrogen bonding between ice and metals. In one embodiment, the invention provides for coating a power line that changes properties with temperature such that the coating melts snow in freezing conditions.

13 Claims, 9 Drawing Sheets

$\theta_2 < \theta_0 < \theta_1$

SYSTEMS AND METHODS FOR MODIFYING ICE ADHESION STRENGTH

This application claims priority from provisional application Ser. No. 60/105,782, filed Oct. 27, 1998.

Funding for the invention was provided through DOD Award #DAAH04-95-1-0189 and NSF Award #MSS-9302797.

Government License Rights. The U.S. Government has certain rights in this invention as provided for by the terms of Grant #DAAH 04-95-1-0189 awarded by the Army Research Office.

FIELD OF THE INVENTION

The invention relates to methods and apparatus for modifying ice adhesion strength between ice and selected materials. More particularly, the invention relates to systems and methods which apply electrical energy to the interface between ice and such materials so as to either increase or decrease the ice adhesion strength to facilitate desired results.

BACKGROUND

Ice adhesion to certain surfaces causes many problems. For example, excessive ice accumulation on aircraft wings endangers the plane and its passengers. Ice on ship hulls creates navigational difficulties, the expenditure of additional power to navigate through water and ice, and certain unsafe conditions. The need to scrape ice that forms on automobile windshields is regarded by most adults as a bothersome and recurring chore; and any residual ice risks driver visibility and safety.

Icing and ice adhesion also causes problems with helicopter blades, and with public roads. Billions of dollars are spent on ice and snow removal and control. Ice also adheres to metals, plastics, glasses and ceramics, creating other day-to-day difficulties.

Icing on power lines is also problematic. Icing adds weight to the power lines which causes power outages, costing billions of dollars in direct and indirect costs.

In the prior art, methods for dealing with ice adhesion vary, though most techniques involve some form of scraping, melting or breaking. For example, the aircraft industry utilizes a de-icing solution such as Ethyl Glycol to douse aircraft wings so as to melt the ice thereon. This process is both costly and environmentally hazardous; however, the risk to passenger safety warrants its use. Other aircraft utilize a rubber tube aligned along the front of the aircraft wing, whereby the tube is periodically inflated to break any ice disposed thereon. Still other aircraft redirect jet engine heat onto the wing so as to melt the ice.

These prior art methods have limitations and difficulties. First, prop-propelled aircraft do not have jet engines. Secondly, rubber tubing on the front of aircraft wings is not aerodynamically efficient. Third, de-icing costs are extremely high, at $2500–$3500 per application; and it can be applied up to about ten times per day on some aircraft!

The above-referenced problems generally derive from the propensity of ice to stick and form onto surfaces. However, ice also creates difficulties in that it has an extremely low coefficient of friction. Each year, for example, ice on the roadway causes numerous automobile accidents, costing both human life and extensive property damage. If automobile tires gripped ice more efficiently, there would likely be fewer accidents.

It is, accordingly, an object of the invention to provide systems and methods which modify ice adhesion strength beneficially.

A further object of the invention is to provide systems for reducing ice adhesion on vehicle surfaces such as aircraft wings, ship hulls and windshields to facilitate ice removal.

Still another object of the invention is to provide systems for increasing the coefficient of friction between ice-clad roads and automobile tires, and between ice and other objects such as shoe soles and cross-country skis.

These and other objects will become apparent in the description which follows.

SUMMARY OF THE INVENTION

Certain of above-referenced problems would be lessened if the ice adhesion strength were decreased between the ice and the surface upon which the ice forms. For example, if the adhesion strength between the ice and an aircraft wing were decreased sufficiently, wind pressure, buffeting or light manual brushing would remove the ice from the wing. Similarly, scraping an automobile windshield so as to be free of ice would be much less difficult if the ice adhesion strength between the ice and the windshield were lessened.

Other above-referenced problems would be lessened if the ice adhesion strength between ice and surfaces in contact with the ice were increased. For example, if the ice adhesion strength were increased between automobile tires and icy roadways, then there would be less slippage and fewer accidents.

Ice has certain physical properties which allow the present invention to selectively modify the adhesion of ice to conductive (and semi-conductive) surfaces. First, ice is a protonic semiconductor, a small class of semiconductors whose charge carriers are protons rather than electrons. This phenomenon results from hydrogen bonding within the ice. Hydrogen bonding occurs because the hydrogen atoms of water molecules in ice share their electrons with an oxygen atom. Thus, the nucleus of the water molecule—uniquely a single proton—remains available to bond with adjacent water molecules.

Similar to typical electron-based semiconductors, ice is electrically conductive. While this electrical conductivity is generally weak, the conductivity can be altered by adding chemical agents that donate or accept extra charge-carrying particles, i.e., protons in the case of ice.

Another physical property of ice is its evaporability. Evaporability of a substance is a function of vapor pressure at the substance surface. In most materials, vapor pressure drops rapidly at the liquid-to-solid interface. In ice, however, there is virtually no change in vapor pressure at the liquid-to-solid interface. The reason for this is that the surface of ice is covered with a liquid-like layer ("LLL").

The LLL has important physical characteristics. First, the LLL is only nanometers thick. Second, it ranges in viscosity from almost water-like, at temperatures at or near to freezing, to very viscous at lower temperatures. Further, the LLL exists at temperatures as low as −100° C., and thus practically exists for most temperatures around the planet.

The LLL is also a major factor of ice adhesion strength. For example, if one brings the smooth surface of ice in contact with the smooth surface of an airplane wing, the actual area of contact between the two surfaces is on the order of one-thousandth of the total interface area between the two surfaces. The LLL functions as a wetting substance between the surfaces—the principal behind almost all adhesives—and substantially increases the effective contact area between the surfaces. This increase in contact area strongly affects ice adhesion.

The combination of the semiconductive properties of ice and the LLL allows one to selectively manipulate ice adhesion strength between ice and other surfaces. Generally, water molecules within a piece of ice are randomly oriented. On the surface, however, the molecules are substantially oriented in the same direction, either outward or inward. As a result, all their protons, and hence the positive charges, either face outward or inward.

While the exact mechanism is unknown, it is likely that the randomness of water molecules transitions to an ordered orientation within the LLL. However, the practical result of the ordering is that a high density of electrical charges, either positive or negative, occurs at the surface. Accordingly, if a charge is generated on the surface coming on contact with ice, it is possible to selectively modify the adhesion between the two surfaces. As like charges repel and opposites attract, an externally applied electrical bias at the interface of the ice and the other surface either reduces or enhances the adhesion between the ice and the surface.

In one aspect, the invention provides a power source connected to apply a DC voltage across the interface between ice and the surface upon which the ice forms. By way of example, the conductive surface can be an aircraft wing or a ship's hull (or even the paint applied to the structure). A first electrode connects with the surface; a nonconductive or electrically insulating material is applied as a grid over the surface; and a second electrode is formed by applying a conductive material, for example conductive paint, over the insulating material, but without contacting the surface. The surface area of the second electrode should be small as compared to the overall surface area protected by the system. By way of example, the surface area under protection (i.e., that area sought to be "ice-free") should be at least about ten times larger than the surface area of the second electrode.

One or more wires connect the second electrode to the power source; while one or more wires connect the first electrode to the power source. Ice forming over the surface and the conductive grid second electrode completes the circuit. A voltage is then applied to the circuit, selectively, which controllably modifies the ice adhesion strength of the ice with the surface.

A voltage regulator subsystem also preferably connects with the circuit so as to adjustably control the voltage applied across the interface and so as to achieve control over the ice adhesion strength. By way of example, ice made from different concentrations of ions can modify the optimum voltage for which the ice adhesion strength is at a minimum; and the voltage regulator subsystem thereby provides a mechanism by which the minimum can be changed selectively.

Other subsystems preferably connect with the circuit to provide other features, for example to detect whether water or ice completes the circuit. In one aspect, the power source is a DC supply (e.g., a battery) which provides voltage to the circuit and which connects to the deicing electrodes. In another aspect, a DC ammeter connects with the circuit to measure the DC conductivity of the ice (i.e., the semiconductive layer which "shorts" the two electrodes when formed over the surface and any part of the grid second electrode). In another aspect, an AC supply connects with the circuit to generate AC voltages between about 10 kHz and 100 kHz, selectively. According to another aspect, an AC ammeter also connects with the circuit to measure the AC conductivity of the ice at frequencies within the 10–100 kHz range. In still another aspect, a current comparator compares the AC and DC conductivities.

These aspects thus provide circuitry which can, for example, distinguish whether the semi-conductive layer formed over the surface is ice, which might be dangerous, or surface water. The AC conductivity (in the above-mentioned range) and DC conductivity of water are substantially the same. With respect to ice, however, the AC conductivity and DC conductivity differ by two to three orders of magnitude. This difference in conductivity is measured by the respective ammeters and is compared in the current comparator. When the difference in conductivity is greater than a predetermined set point, the current comparator signals an icing alarm. At this point, for example, the voltage regulator subsystem can operate to apply a DC bias to the circuit—and thus to the interface—at a desired field strength which sufficiently reduces the ice adhesion strength. According to one aspect of the invention, when ice is detected on an aircraft wing, the icing alarm initiates a feedback loop within the system which (a) measures ice conductivities, (b) determines appropriate bias voltages to reach minimum (or near minimum) ice adhesion conditions, and (c) applies a bias voltage to the ice-wing interface to facilitate ice removal.

Those skilled in the art should appreciate that the above-described system can be applied to many surfaces where it is desired to reduce ice adhesion strength, such as on car windshields, ship hulls and power lines. In such cases, if the surface material is weakly conductive, it is desirable to "dope" the surface material such that it is sufficiently conductive. Doping techniques are known to those in the art. Automobile tires, for example, can be doped with iodine to make the rubber conductive. Automobile glass, likewise, can be doped with either ITO or fluoride doped $SnO_2$ to make the windshield an acceptable semiconductor.

However, in another aspect, the above described system and circuit are also applicable to situations where it is desirable to increase the ice adhesion strength. In this aspect, for example, when the icing alarm detects ice, the system activates the feedback loop to regulate applied DC voltages to the interface so as to increase ice adhesion. Situations and surfaces which can benefit from this system include, for example, the bottom soles of a person's shoe (or shoes) and car tires on icy roads.

In still another aspect, the invention can include a variable ice adhesion/voltage control subsystem which increases and then decreases ice adhesion strength between ice and a surface, selectively. By way of example, cross country skis (or telemarking skis) ideally have higher friction when climbing an incline (or when descending an incline, in certain situations) and have lower friction when "skiing" down an incline. According to one aspect of the invention, the ice adhesion system and circuit described herein is attached in circuit with the skis and the operator can adjustably control ski friction selectively.

Other useful background to the invention may be found with reference to the following papers, each of which is incorporated herein by reference: Petrenko, *The Effect of Static Fields on Ice Friction*, J. Appl. Phys. 76(2), 1216–1219 (1994); Petrenko, *Generation of Electric Fields by Ice and Snow Friction*, J. Appl. Phys. 77(9), 4518–4521 (1995); Khusnatdinov et al., *Electrical Properties of the Ice/Solid Interface*, J. Phys. Chem. B, 101, 6212–6214 (1997); Petrenko, *Study of the Surface of Ice, Ice/Solid and Ice/Liquid Interfaces with Scanning Force Microscopy*, J.

Phys. Chem. B, 101, 6276–6281 (1997); Petrenko et al., *Surface States of Charge Carriers and Electrical Properties of the Surface Layer of Ice*, J. Phys. Chem. B, 101, 6285–6289 (1997); and Ryzlikin et al., *Physical Mechanisms Responsible for Ice Adhesion*, J. Phys. Chem. B, 101, 6267–6270 (1997).

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE DRAWINGS

Figure 1A:
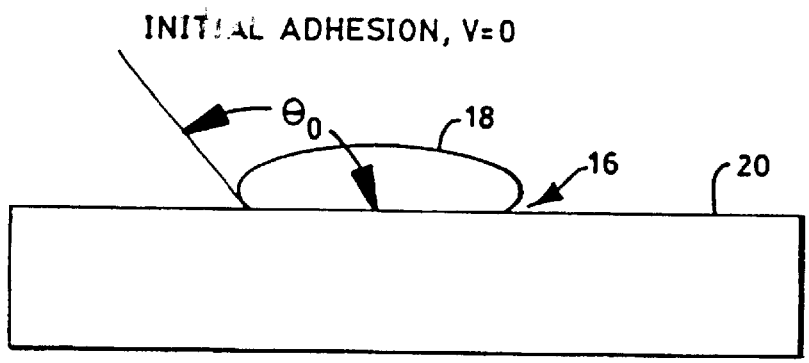
FIGS. 1A–1C illustrate effects of DC bias on ice adhesion to a liquid metal (Mercury), smaller contact angles Θ indicating stronger adhesion.

The invention includes systems and methods which modify ice adhesion strength to materials such as metals and semiconductors by application of a DC bias to the interface between the ice and the materials. The invention can thus be used to reduce and in some cases eliminate the adhesion of ice onto such materials.

In certain embodiments, the invention modifies the electrostatic interactions which form the bonding between ice and metals. These interactions are effectively changed (either reduced or enhanced) by application of a small DC (direct current) bias between the ice and the metals.

Experimentation and theoretical calculations have shown that ice surfaces have high density electrical charges of $10^{-2}$ C/m$^2$ to $3 \cdot 10^{-2}$ C/m$^2$. See, Petrenko et al., *Generation of Electric Fields in Ice and Snow Friction*, J. Appl. Phys., 77(9):4518–21 (1995); Petrenko, *A Study of the Surface of Ice, Ice/Solid and Ice/Liquid Interfaces with Scanning Force Microscopy*, J Phys. Chem. B, 101,6276 (1997); and Dosch et al., Surface Science 366, 43 (1996), each of which is hereby incorporated by reference. This charge density originates from the strong polarization of water molecules in the ice subsurface layer.

The interaction between ice surface charges and the charge induced in a solid affects the strength of an ice-solid interface. By estimation, the electrostatic attraction (negative pressure $P_{el}$) of two plane surface charges is given by:

$$P_{el} = \frac{\epsilon_0 \epsilon E^2}{2} \tag{1}$$

where $\epsilon_0$ is the dielectric permittivity of the vacuum, and E is the electric field strength in the space between the charges. Since the charge distribution determines the contact potential $V_c$ of the two materials, we can estimate E as $V_c/L$, where L is the distance between the plane charges located in the ice and in the solid. $V_c$ for ice-metal interfaces varies from a few tenths of a volt to about 1 V. See, Buser et al., *Charge Separation by Collision of Ice Particles on Metals: Electronic Surface States*, Journal of Glaciology, 21(85): 547–57 (1978), which is incorporated herein by reference.

Taking L≈1 nm (the main screening length in the doped ice illustrations above), $\epsilon$=3.2 (the high-frequency dielectric constant of ice) and $V_c$=0.5 V (the typical magnitude of a contact potential), equation (1) provides that $P_{el}$≈3.3 Mpa, a magnitude comparable with, but exceeding, the macroscopic tensile strength of ice at 1.5 MPa. See, Schulson et al., *A Brittle to Ductile Transition in Ice Under Tension*, Phil. Mag., 49, 353–63 (1984), which is hereby incorporated by reference.

More sophisticated calculations of the electrostatic interaction energy between ice surface charges and metals are shown below, utilizing real space-charge distributions and charge relaxation calculations. Specifically, it is shown below that this interaction energy is 0.01 to 0.5 J/m$^2$ at −10° C. The lower limit 0.01 J/m$^2$ corresponds to pure ice; while the upper value 0.5 J/m$^2$ corresponds to heavy doping. These values are comparable with other experimental results, described below, which utilized scanning force microscopy ("SFM"). The SFM results determined an electrostatic interaction energy of 0.08±0.012 J/m$^2$; and experiments on ice/mercury interfaces return 0.150+/−0.015 J/m$^2$ for that electrostatic part of ice/metal adhesion.

Since electrostatic interactions contribute to ice adhesions, the adhesion strength between ice and a conductive material (e.g., a metal or semiconductor) is changed by an external DC bias applied across the ice-material interface.

To determine the effect of DC bias on ice adhesion, the interface was modeled as a liquid-solid interface instead of a solid-solid interface. Indeed, the interfacial energy which determines the adhesion is reliably measured in a contact-angle experiment when one material is a liquid and the other a solid, as in the water-metal situation. A similar technique is thus employed for an ice-metal interface if the metal is in the liquid phase. Mercury, for example, with its melting point at −38.83° C., low chemical activity, and ease in preparing a clean surface, is well suited to prove the model; and the effects of small DC biases on the adhesion of ice to Mercury is illustrated in FIGS. 1A–1C.

Figure 1B:
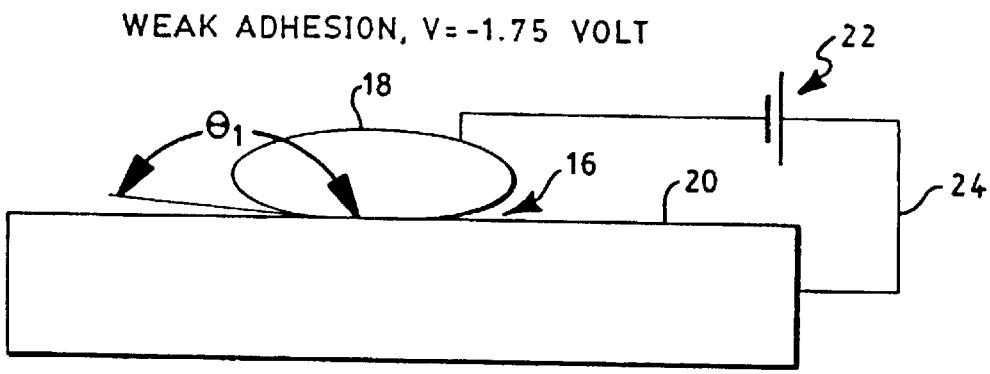
Figure 1C:
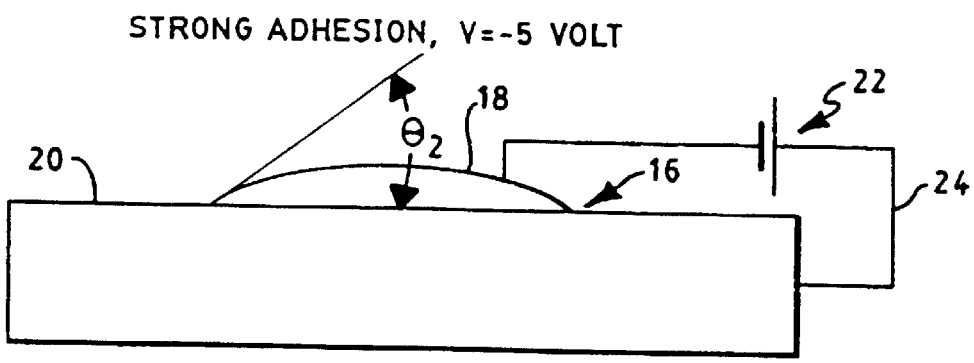

FIG. 1A shows an initial adhesion of Mercury 18 to ice 20, the adhesion strength being represented by $\Theta_0$.

Accordingly, $\Theta_0$ represents adhesion strength without applied voltage (i.e., V=0). FIG. 1B, on the other hand, illustrates the resultant adhesion strength $\Theta_1$ which occurs with the application of −1.75V supplied by a DC voltage source 22. The source 22 can be, for example, a battery or other voltage source known in the art. Wiring 24 connects the source 22 to the Mercury 18 and to the ice 20 to complete the circuit. FIG. 1C illustrates another adhesion strength $\Theta_2$ which results from an applied voltage of −5 V provided by the source 22. It is noteworthy that $\Theta_2 < \Theta_0 < \Theta_1$ even though the applied voltage varies from 0 V (FIG. 1A) to −1.75 V (FIG. 1B) to −5 V (FIG. 1C), indicating a significant change of adhesion strength through a small range of negative voltage differentials. Adhesion strength $\Theta_1$ shows a relatively "weak" adhesion as compared to $\Theta_2$ or even $\Theta_0$. Adhesion strength $\Theta_2$, on the other hand, is relatively "strong" as compared to $\Theta_1$ and $\Theta_0$.

To measure the surface tension of the ice-mercury interface 16 of FIG. 1, an ice manometer 26 (schematically shown in FIG. 2) was used. The DC power supply 22' was used for the source 22 of FIG. 1. A DC ammeter 28 was placed in the manometer circuit 26 to measure current flow. The source 22' connects in circuit to the Mercury 18' and to a mesh electrode 30 connected with the ice 20'. Accordingly, the circuit 26 is completed by the current flow through the Mercury 18' and the ice 20'. The Mercury 18' is in fluid communication with the ice 20' through a small capillary 32 of selected diameter. As the DC bias changes, the ice adhesion between the Mercury 18' and the ice 20' changes and forces due to gravity adjusts the height "h" of the Mercury 18' within the ice 20' (i.e., within the capillary 32 extending upwards into the ice 20').

Figure 2:
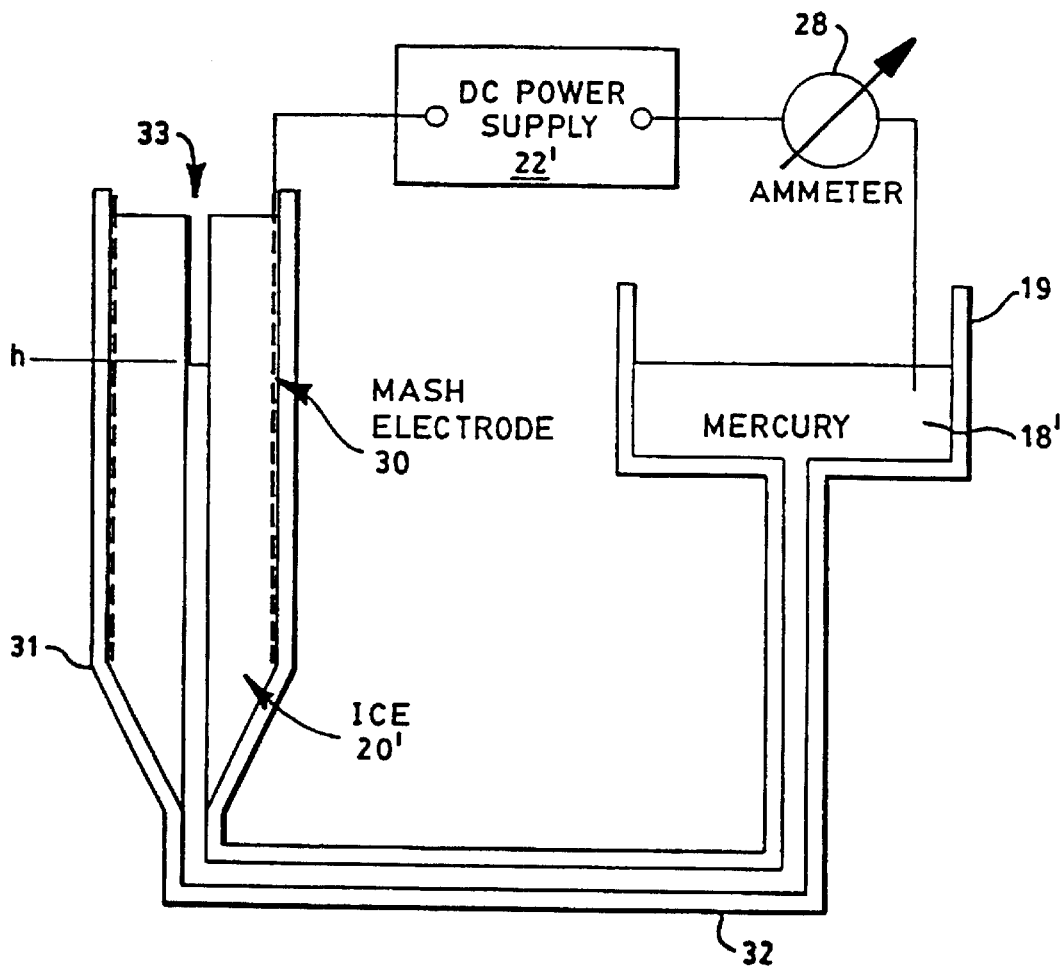
FIG. 2 schematically illustrates an ice manometer used in measurements of ice-mercury interfacial energy such as illustrated in FIG. 1A–1C.

Specifically, the equilibrium position h of the Mercury 18' in the capillary 32 is:

$$h \cong 2 \cdot (W_{i/a} - W_{i/Hg})/grp \qquad (2)$$

where g is gravity acceleration, r is the capillary radius, ρ is the density of mercury, $W_{i/a}$ is the surface energy of the ice-air interface, and $W_{i/Hg}$ is the surface energy of the ice-Hg interface. When h is measured, equation (2) is used to calculate $W_{i/Hg}$, and, thereby, the adhesion strength of ice to the liquid metal (Mercury). In FIG. 2, the capillary's radius r was 0.25 or 0.5 mm during testing.

Figure 3:
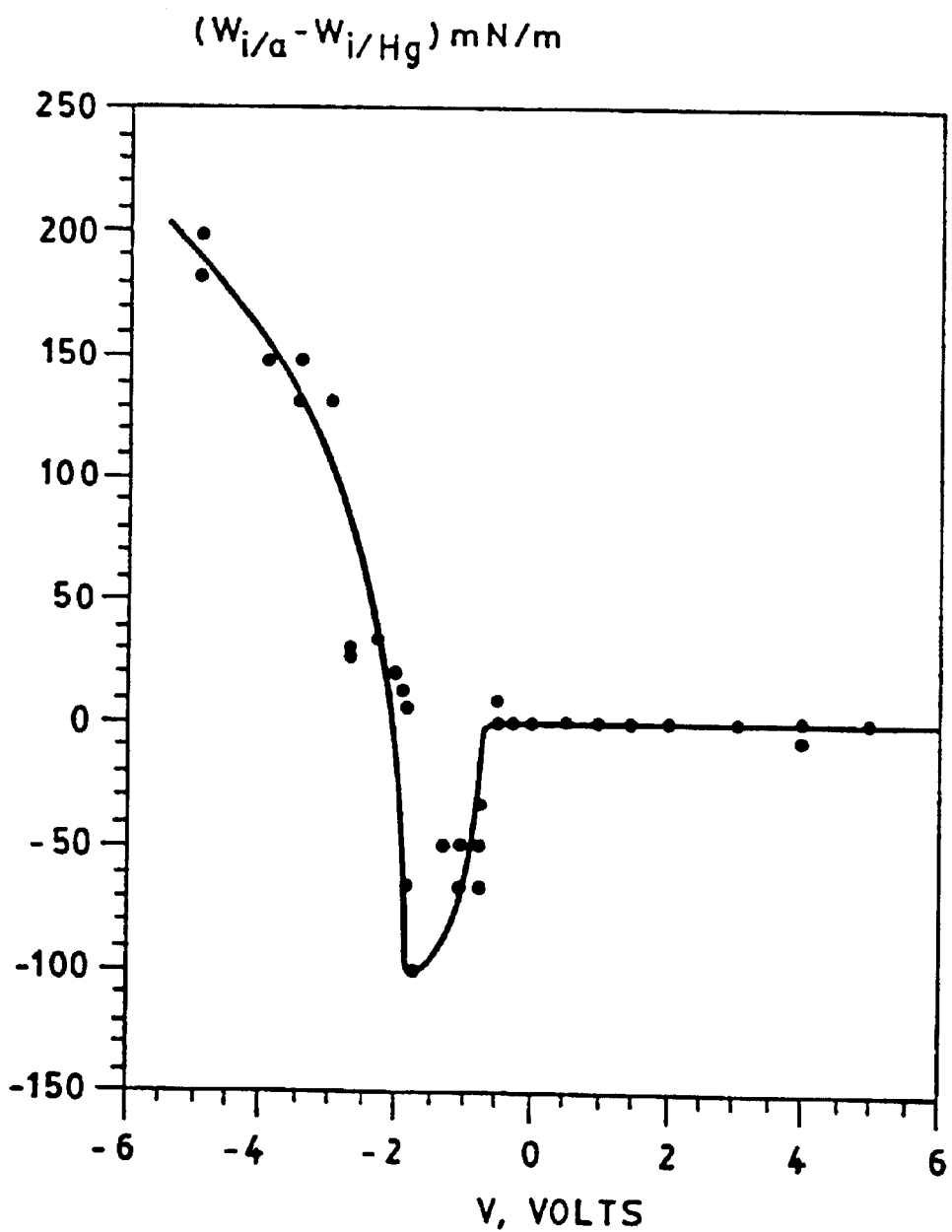
FIG. 3 graphically illustrates experimental results of DC bias versus ice-Hg interfacial energy for ice doped with 0.5% NaCl, T=−10° C.

Additional experimentation such as within the configurations of FIGS. 1 and 2 include 99.9998% pure electronic grade Mercury and polycrystalline ices grown from: very pure deionized water; distilled water; untreated tap water; and deionized water doped with small concentrations of NaCl or KOH or HF. The experiments were performed inside a cold room in the temperature range −20° C. to −5° C., ±2° C. (most testing was conducted at −10° C. and with a relative humidity of 89–91%). For doped ices, it was noted that DC bias had a strong effect on the ice-Mercury interfacial energy. The magnitude and sign of the energy change $\Delta(W_{i/a} - W_{i/Hg})$ depends upon the bias polarity and magnitude and on the type and concentration of the dopant. FIG. 3, for example, shows $\Delta(W_{i/a} - W_{i/Hg})$ versus bias V measured at T=−10° C. for ice doped with 0.5% NaCl. As illustrated, the bias can reduce or enhance adhesion of ice to Mercury: at approximately −1.75 V, a minimum adhesion strength was reached; while the adhesion strength increased from −2 V to −6 V. The effect of interfacial energy is more pronounced for NaCl concentrations above 0.05%.

With lower concentrations of NaCl, or with ice grown from tap water, the adhesion strength varied little and was weakly reproducible when a low DC bias was applied. With ice doped with 0.5% NaCl, on the other hand, the mercury moved immediately after the voltage bias is applied; and the effect was completely reversible, i.e., $W_{i/Hg}$, was restored, after the bias was shut off. These results are reproducible and easy to observe. The maximum change in h was 12 mm for a capillary radius r=0.25 mm.

Measurements of current-voltage characteristics also show that it is the voltage, not the current, that causes the changes in adhesion strength discussed above. Typical experimentation, for example, produced current strengths in tens of $\mu A$; and the estimated rate of the temperature change was less than $10^{-6°}$ C./s. In ice doped with KOH or HF, the application of a DC bias caused a near-symmetrical decrease in $W_{i/Hg}$, which was comparable in magnitude with that found on NaCl-doped ice. Application of an AC voltage up to 40 V in amplitude and in the frequency range 10 Hz to 10 kHz did not produce any noticeable changes in $W_{i/Hg}$. In pure deionized or distilled water, the application of a DC bias up to 40 V also did not produce noticeable changes in $W_{i/Hg}$. It thus takes 1 kV to 3 kV to change the adhesion of very pure ice to a metal. Different reactions of pure and doped ice to a DC bias are attributed to their differences in screening length and electric relaxation time.

The above experimentation confirms the important role played by electrical double layers on ice-metal interfaces in ice adhesion. Although the absolute magnitude of $W_{i/Hg}$ can slightly differ in the case of solid Mercury, the electrostatic interactions are essentially the same in both cases (for liquid Hg and solid Hg). It was also shown by experimentation that ice adhesion to a metal is efficiently modified by application of a small potential difference between the ice and metal. Variations of adhesion strength also occur for a DC bias applied to ice containing different impurities, to different solid metals, and at different temperatures.

The inventor has also studied an electrostatic model of ice adhesion based on the existence of the surface states of protonic charge carriers on the surface of ice. At distances greater than one intermolecular distance the model gives an order of magnitude for the adhesive energy which is significantly greater than both chemical bonding energy and van der Waals forces. It also provides an understanding of the time- and temperature-dependent phenomena that explain the difference between adhesive properties of ice and water, the physical mechanisms of bonding between ice and other solids, and the nature and strength of molecular bonding between ice and various solids.

It is reasonable to classify bonding mechanisms into one of three groups: a covalent or chemical bonding mechanism, a dispersion of or fluctuation in electromagnetic interaction (van der Waals forces), or a direct electrostatic interaction. See, e.g., Israelachvili, *Intermolecular and Surface Forces*, 2nd ed., Academic Press: London, Ch. 2 (1991), which is herein incorporated by reference. The first mechanism corresponds to chemical reactions and the formation of interfacial compounds. In covalent or chemical bonding, the adhesive energy results from lowering of the quantum-mechanical energy of the system due to overlap of the wave functions of the interacting solids. Such an interaction is essential only at a distance on the order of 0.1–0.2 nm. In addition, this type of adhesion is very sensitive to the chemical nature of adhesive solids. In a perfect contact, the chemical bonding mechanism can provide adhesive energy of $\leq 0.5$ J/m², a value considered the lowest value of adhesion energy for the chemical bonding mechanism.

In contrast to chemical bonding, van der Waals forces are long-range and act between all substances. These forces are defined only by the macroscopic characteristics of a solid (dielectric function at different frequencies), and for this reason they are rather insensitive to experimental conditions. See, e.g., Mahanty et al., *Dispersion Forces*, Academic Press, London, Chapter 9 (1976); Barash et al., *The Dielectric Function of Condensed Systems*, Eds. Keldysh, et al., Elsiever Science, Amsterdam, Chapter 9 (1989), each of which is incorporated by reference.

In addition to chemical bonding and dispersion forces, two solids that contain noncompensated or spatially separated charges also generate electrostatic forces. Its importance and importance to adhesion have recently been rediscovered. See, Stoneham et al., *J. Phys. C: Solid State Physics*, 18, L543 (1985); and Hays, *Fundamentals of Adhesion*, Ed. Lee, Lee, Plenum Press, New York, Chapter 8 (1991), each of which is incorporated by reference.

Model of Adhesion Properties of Ice

A model is next developed to describe the electrical properties of the surface of ice. The model reveals a connection between ice adhesion and other properties of ice. The model is compared with van der Waals forces, the chemical bonding mechanism, and with experimental results.

The main conclusion of the model discussed below is that electrostatic interaction plays a significant, if not the major, role in ice adhesion. One important parameter in the model is that of the ordering of water molecules adjacent to the ice-solid interface or, in other words, that of the appearance of the surface states for protonic charge carriers. This reduces the problem to one of simulating water molecule behavior at the solid surface. However, the below description will assume that there exist surface states that can be is occupied by protonic point defects. The occupancy of these surface states is defined by the interplay between the coulomb energy of captured charge carriers and the energy depth of the surface states. Then, either the occupancy coefficient of a surface state (in the nonequilibrium case) or the energy depth of the surface state will be taken as a parameter.

Ice includes polar water molecules that strongly interact with any solid substrate which has dielectric permittivity different from that of ice. In addition, there is theoretical and experimental evidence for the existence of a surface charge in ice. This surface charge can also interact with the substrate. Here we assume that the surface charge originates from the capture of protonic charge carriers by the ice surface. The captured defects are presumably D defects, $H_3O^+$ ions, or protons. Positive ions are smaller in size than negative ones, because they have fewer electrons or do not have them at all, and exist as protons. Thus we can use the image charge theory for smaller distances, where the potential energy of the charge and its image may be less than the charge energy within the ice. For negative ions of larger size it is more difficult to reach this. At thermal equilibrium the occupancy of surface states is not perfect because the gain in energy due to captured charge carriers is compensated for by the rise in electrostatic energy. However, the electrostatic energy itself can be reduced significantly by charge redistribution inside the substrate (by induced charges). This could lead to perfect occupancy of the surface states and rather high adhesion energy (close to the electrostatic energy).

The spatial distribution of charge carriers in the subsurface layer of ice is described below. The first integral of Poisson's equation can be written in the following form:

$$E = \frac{\sigma_0}{\epsilon\epsilon_0} f(V) \tag{3}$$

where E and V are the electric field strength and electrostatic potential, respectively (both are functions of the space coordinate z); $\sigma_0 = e_B \cdot \lambda \cdot N$; $e_B$ is the effective charge of Bjerrum defects; N is the concentration of water molecules; $\lambda$ is the screening length given by $\sqrt{\epsilon\epsilon_0 kT/e_B^2 N}$; $\epsilon$ and $\epsilon_0$ are, respectively, the dielectric permittivities of ice ($\approx 3.2$) and of a vacuum' and k and T are the Boltzmann's constant and temperature, respectively. The function f(V) is defined by the following equations:

$$f(V) = \sqrt{\ln(a(V) \cdot a(-V) \cdot b^{2(V)} \cdot b^{2(-V)})} \tag{4}$$

$$a(V) = \frac{\exp(E_i/2kT) + (4/3)\exp(e_i V/kT)}{\exp(E_i/2kT) + 4/3} \tag{5}$$

$$b(V) = \frac{\exp(E_B/2kT) + \exp(e_B V/kT)}{\exp(E_B/2kT) + 1} \tag{6}$$

Here we use Bjerrum defects as charge carriers being captured in the surface states. Equation (3) holds at any point of the ice crystal. Applying it to the ice surface, we get the relationship between the surface charge density as and the surface potential $V_s$: $\sigma_s = \sigma_0 f(V_s)$.

Using equations (3) through (6), we can now calculate the electrostatic contribution to the adhesion energy of ice. First, the electrostatic energy of the screening layer of ice as a function of the surface potential is calculated, since it gives the upper limit for the adhesion energy. Using the definition of electrostatic energy and equation (3) we get:

$$W(V_s) = \int_0^\infty \frac{\epsilon\epsilon_0}{2} E^2 \, dx = -\frac{\sigma_0}{2} \cdot \int_0^\infty f(V) \cdot \frac{dV}{dx} \, dx = \frac{\sigma_0}{2} \cdot \int_0^V f(V) dV \tag{7}$$

Now let us consider a metallic plate at a distance d from an ice surface. The non-uniform charge distribution in the ice will induce a surface charge on the metal and, therefore, an electric field between the ice and the metal plate. The total electrostatic energy of the system per unit area can be written in the following form:

$$W_e(d, V) = \frac{\sigma_0^2 \cdot d}{2\epsilon\epsilon_0} \cdot \left[f(V) - \frac{\sigma}{\sigma_0}\right]^2 + \frac{\sigma_0}{2} \cdot \int_0^V f(V') dV' \tag{8}$$

However, V in equation (8) is the surface potential of ice, which has to be found from minimization of the energy for each value of distance d. Surface charge density can be considered a constant, which arguably corresponds to a non-equilibrium occupancy of the s surface states. Performing a minimization procedure for $W_e(d,V)$, we arrive at the adhesion energy per unit area as a function of d:

$$W_a(d) = W_{min}(d) - W_{min}(\infty) \tag{9}$$

Under equilibrium conditions, the surface charge density of ice increases with a decrease in the distance d because of screening of the ice surface charge by an induced charge on the metal plate. Indeed, in this case the coulomb energy of captured charge carriers decreases, so higher occupancy becomes possible. In considering this case one first has to sum up the electrostatic energy, the energy gain due to occupancy of the surface states, and the entropy contribution of the surface defects:

$$F = \frac{d\sigma_0^2}{2\epsilon\epsilon_0} \cdot \left[f(V) - \frac{\sigma}{\sigma_0}\right]^2 + \frac{\sigma_0}{2} \cdot \int_0^V f(V')dV' - \frac{\sigma}{e} \cdot E_0 + \frac{kT}{e} \cdot \left[\sigma \cdot \ln\left(\frac{\sigma}{\sigma_m}\right) + (\sigma_m - \sigma) \cdot \ln\left(1 - \frac{\sigma}{\sigma_m}\right)\right] \qquad (10)$$

Here $E_0$ is the energy of surface states (assuming $E_0 = -0.5$ eV), $\sigma_m = e/S$, and S is the surface area of one water molecule. The free energy F is then minimized over V and $\sigma$. This procedure also assumes that the chemical potential of the ice bulk is kept constant and equals zero. Doing so for every value of d, we arrive at the equilibrium free energy as a function of the distance or equilibrium adhesion energy.

A similar procedure enables us to find the equilibrium occupancy of the surface state or the surface potential of ice as a function of the energy of surface states $E_0$ or temperature. Let us assume that the metallic plate is infinitely far from the ice surface. Then, to minimize the first positive element in equation (8), it is assumed that $\sigma = \sigma_0 f(V)$. F then becomes a function of only one parameter, either V or $\sigma$. It is somewhat easier to perform the final minimization over V, but the results can also be recalculated as a function of $\sigma$.

Typical values of the adhesion energy are located between 1.3 $J/m^2$ and 0.08 $J/m^2$, depending on the type of charge carriers and the energy of their surface states. This magnitude is comparable to, or even higher than, the experimentally measured adhesion energy of ice-metal interfaces at $-20°$ C. In fact, the adhesion energy is as high as the chemical bonding mechanism; however, in contrast to the latter, the electrostatic mechanism remains significant up to a larger distance (about $10 \cdot r_{oo}$; $r_{oo} = 0.276$ nm). Thus, at distances larger than $r_{oo}$, the electrostatic mechanism is significantly more important than the chemical bonding mechanism. Accordingly, at distances greater than $r_{oo}$, the electrostatic energy exceeds that of the van der Waals forces if the Hamaker constant equals $3 \cdot 10^{-20}$ J. Note that the last estimation concerns an ice-ice (or water-water) interface, but not an ice-metal interface. The van der Waals interaction between ice and metal, which is also long-ranged, can also be considered.

The adhesive energy thus equals 0.01 $J/m^2$ even at $z \approx 90 \cdot r_{oo}$ for the maximum density of a surface charge, indicating long range character. The adhesive energy for a non-equilibrium detaching experiment should be higher than that for an attaching one. The latter can be explained by efficient screening of electrostatic energy by a metallic plate when ice and metal are in contact. The behavior of adhesion energy with distance in equilibrium experiments is thus readily understood. At small distances a metallic plate screens the electrostatic energy and there is high adhesive energy because the occupancy of surface states is high. However, when the distance increases, the electrostatic energy also increases, leading to lower occupancy coefficients and a lower surface charge density. These curves are equivalent to the more rapid decay of free energy with distance than in the case of constant occupancy.

The behavior of the occupancy coefficient (for the model of the surface states for D defects) as a function of the surface state energy, $E_S$, is also considered The occupancy coefficient is close to zero when $E_S \approx 0.1$ eV. One reason that the charge carriers are captured into the surface states with positive energy has to do with the entropy gain in the free energy. For the same reason, defects exist in the ice bulk. Note that for the bulk D defects, the "creation energy" equals 0.34 eV per defect, and this energy is significantly greater than 0.1 eV. Eventually this leads to an "occupancy coefficient" for the bulk states on the order of $3 \cdot 10^{-7}$.

Time-dependent phenomena can also be associated with ice adhesion, and are inherent in the above-described model. In order to enter or leave the surface state, defects have to overcome some electrostatic barrier, and this leads to non-equilibrium situations and time-dependent phenomena.

One important element of this model is the electrostatic attraction between the ice surface charges and the charges induced in metals, a mechanism also applicable to an ice-insulator interface except for the difference in magnitude of the induced charges. A charge q on the ice surface induces the "image charge" $-q$ in a metal; while the same charge q will induce a smaller "image" charge q' in the insulator according to the following relationship:

$$q' = -q \cdot \frac{\epsilon - 1}{\epsilon + 1} \qquad (11)$$

where $\epsilon$ is a dielectric permittivity of the insulator. In most solid dielectrics, $\epsilon$ is much larger than one and the induced charges are comparable with charges induced in metals. A smaller $\epsilon$ results in smaller electrostatic related adhesion. By way of example, Teflon, has a permittivity $\epsilon = 2.04$; and is well known for its low adhesion to ice.

It is useful to consider why ice is more adhesive than water. Due to higher concentrations of charge carriers in water, the screening of the surface charge in water (if it is present) is more effective than in ice (the corresponding initial electrostatic energy is much less than in ice). Thus the screening of the electric field due to the substrate cannot lower the energy significantly. Note that at temperatures close to the melting point of ice, a thin liquid layer may appear on an ice-solid interface. See Dash et al., *Rep. Prog. Phys.* 58, 115 (1995), which is hereby incorporated by reference. The model can thus be updated to include the effect of surface premelting on ice adhesion.

The above-described electrostatic model of ice adhesion shows a relationship between the electrical properties of the surface of ice and ice adhesion. The model gives a correct order of magnitude for the adhesive energy. The electrostatic interaction between ice and metals supplies energy which is significantly higher than chemical bonding energy and the van der Waals forces at distances greater than intermolecular ones. The model also provides an intuitive way to understand the time- and temperature-dependent phenomena that help explain the difference in adhesive properties of ice and water.

Figure 4:
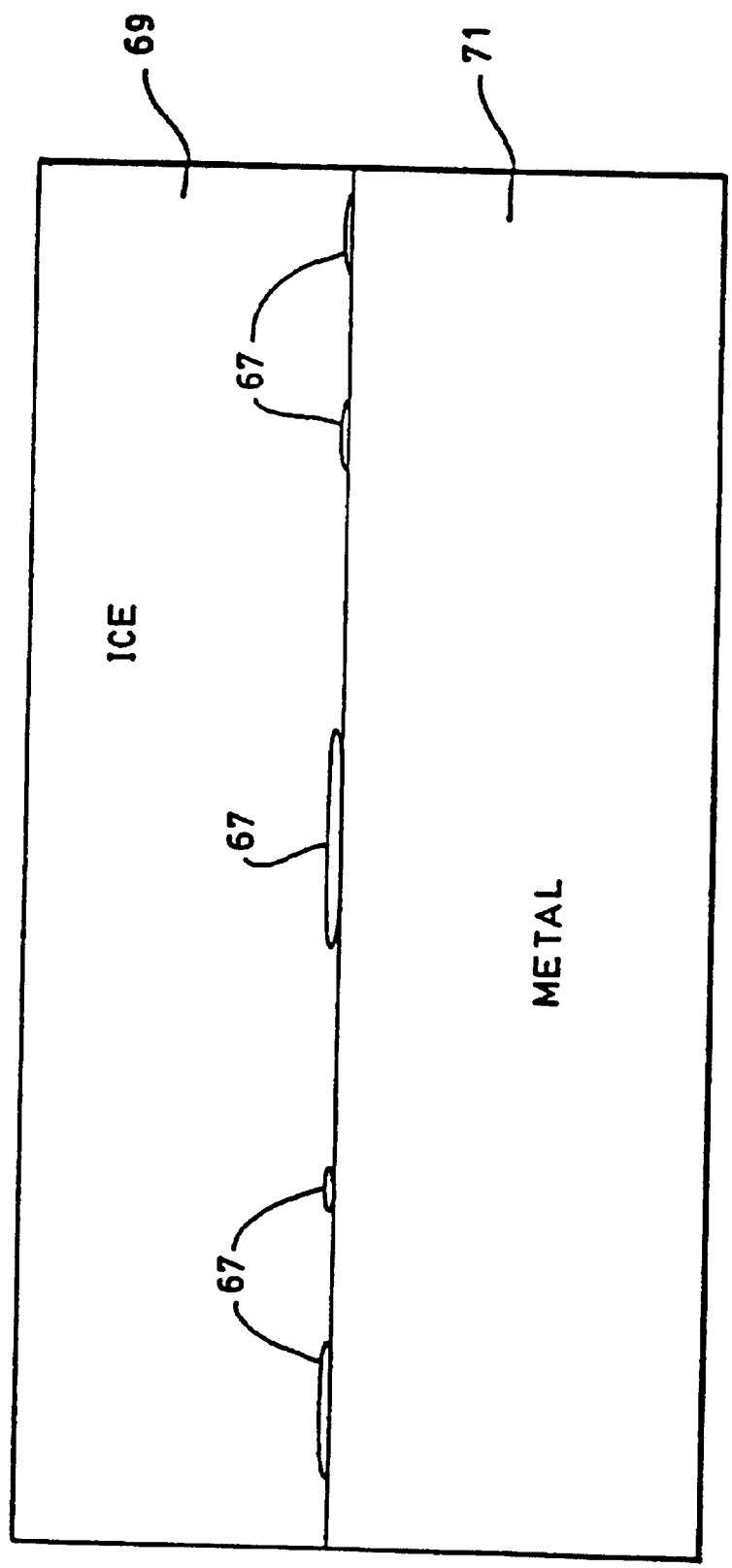
FIG. 4 illustrates how production of gas bubbles at an ice/metal interface functions as an interfacial crack to reduce interfacial strength.

As illustrated in FIG. 4, bubbles 67 play a role in development of interfacial cracks which appear when the interface (between the ice 69 and metal 71) is loaded, reducing the maximum interfacial strength.

Figure 5:
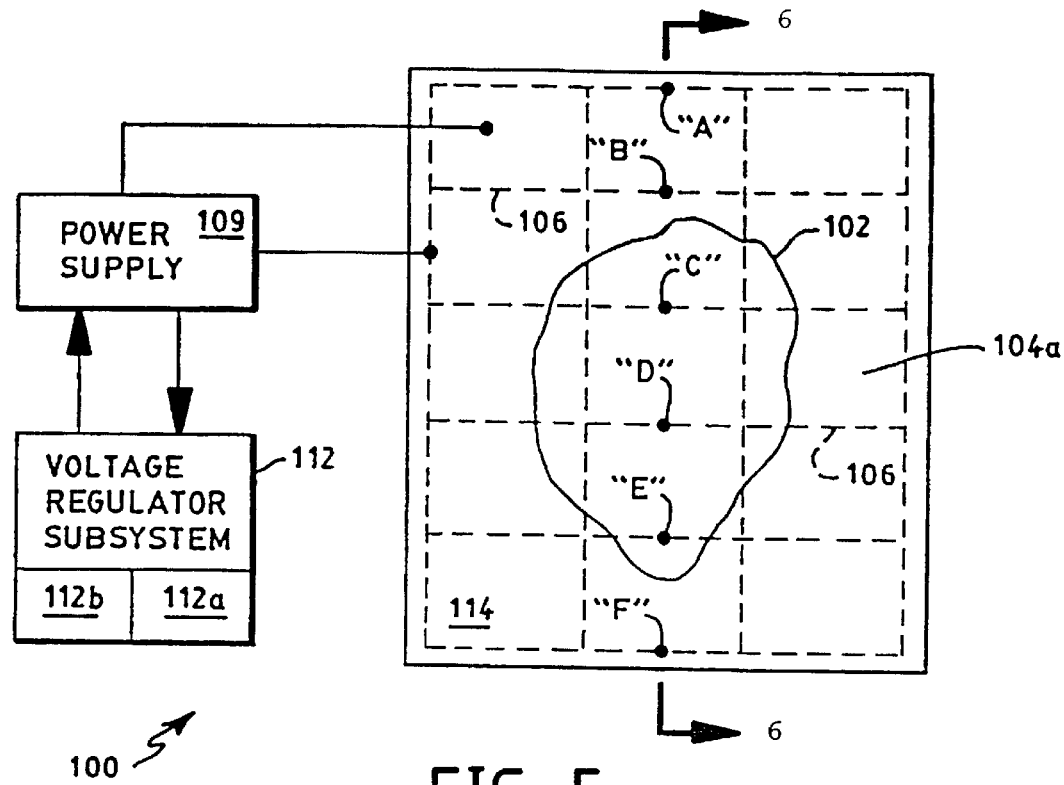
FIG. 5 illustrates one system constructed according to the invention for modifying ice adhesion to a generic conductive (or semiconductor) material.

FIG. 5 (and cross-sectional view 6) illustrate a system 100 constructed according to the invention. System 100 operates to reduce the adhesion of ice 102 formed onto the surface 104*a* of a material 104. The system 100 forms a circuit that includes the material 104, a conductive grid 106 (including illustrative points "A"–"F" on the grid), and a power supply 109. The grid 106 is suspended above the surface 104a so that it remains electrically insulated from the material 104.

Figure 6:
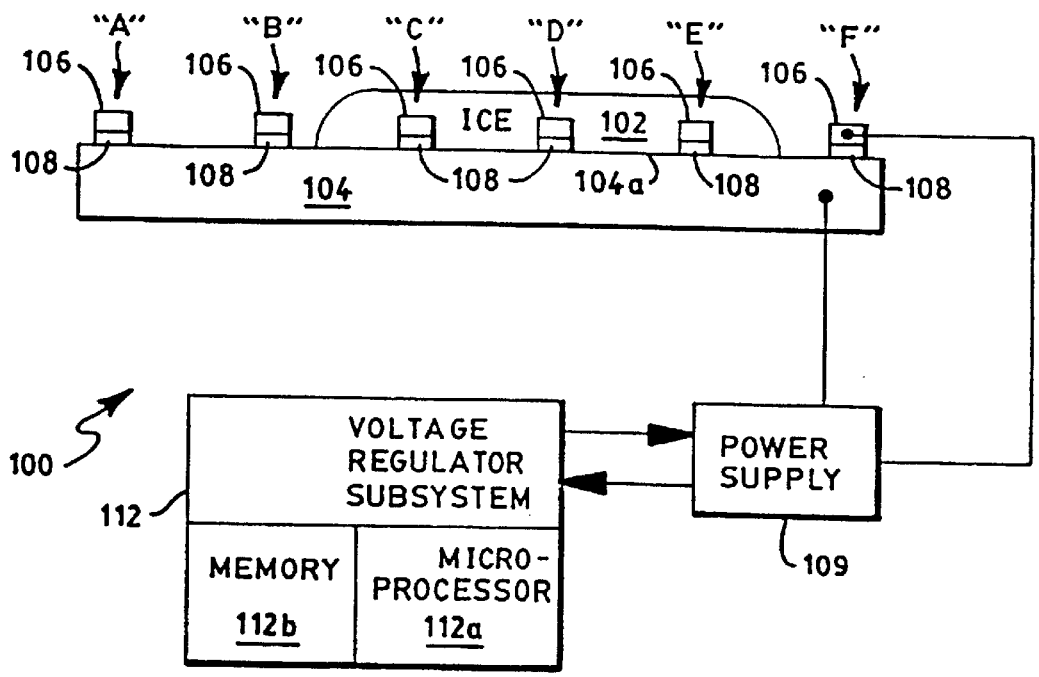
FIG. 6 shows a cross-sectional view (not to scale) of the system of FIG. 5.

In a preferred embodiment of the invention, the suspension of the grid 106 over the surface 104a is obtained through use of an insulating grid 108 disposed between the grid 106 and the surface 104a. FIG. 6 illustrates the grid 108 in greater detail. The cross-sectional view of FIG. 6 is not to scale so as to illustrate the relationship of the insulating grid 108 and the conducting grid 106. In reality, the thickness (in the dimension of FIG. 6) of the grids 106, 108 can be much smaller than an inch (even as low as 0.010 to 0.020 inch); and can be considered as "coatings". By way of example, the grid 108 can be made from a thin coating of electrically insulating paint; while the grid 106 can be made from a thin coating of electrically conductive paint. The grid 106 is connected so as to function as a single electrode. The material 104 thus becomes a first electrode of the system 100; and the grid 106 becomes the second electrode in the circuit.

Grids 106, 108 can also be pliant and formable over the surface 104a, which can represent any shape even though a flat surface 104a is shown. By way of example, the material 104 can represent an aircraft wing or a car windshield; and the grids 106, 108 are conformal to the structure material 104.

When ice 102 forms onto the surface 104a, the circuit of system 100 is completed as the ice 102 operates as a semiconductor (as discussed above). When the circuit is completed, the power supply 109 provides a DC bias to the interface between the ice 102 and the material 104. The bias is typically less than a few volts; and thus a battery can function as the supply 109.

The magnitude of the bias depends upon the desired application. In the case of a car windshield or an airplane wing, the bias is selected so that a minimum (or near-minimum) ice adhesion results, thereby facilitating the removal of the ice 102 from the material 104.

A voltage regulator subsystem 112 is also preferably connected in circuit with the system 100. As described in more detail below, the voltage regulator subsystem 112 operates in feedback with the circuit and the supply 109 so as to decrease or increase the DC bias in an optimum fashion. By way of example, the subsystem can include circuitry and a microprocessor 112a to measure data from the circuit and to determine the conductivity (and/or temperature) of the ice 102. Such measurements are used in turn by the subsystem 112 to generate a signal which effectively changes the amount of the DC bias applied to the circuit. Specifically, in one embodiment, the power supply 109 is responsive to the signal to generate the right voltage at the ice-material interface. The value of the DC bias can be stored in memory 112b within the subsystem 112 such as through a look-up table and based upon experimental data. For example, ice with a conductivity of "X" (as measured by the subsystem, in real time preferably) in contact with a material 104 of conductivity "Y" (known a priori, as the system 100 is installed with the material 104 for a given application) will be used through the look-up table in memory 112b to determine which voltage to apply to the ice-material interface.

The grid electrode 106 is preferably spaced so as to ensure (as best as possible) that ice 102 formed onto the surface 104a will contact at least some portion of the grid 106. With reference to FIG. 5, for example, the ice 102 comes in contact with several areas of the grid 106, including at points "C"–"E". Accordingly, the circuit of system 100 will be completed as the ice 102 "shorts" at least one part of the grid to material electrodes 106, 104, respectively.

The actual size of the spacing between conductive areas of the grid 106—for example, the area 114 of FIG. 5—should be sized for the specific application. By way of example, if the surface 104a is the surface of an aircraft wing, then the spacing can be relatively small to provide sufficient current density through a low conductive atmospheric ice. However, for a more conductive river or sea ice area, area 114 can be larger, if desired.

Figure 7:
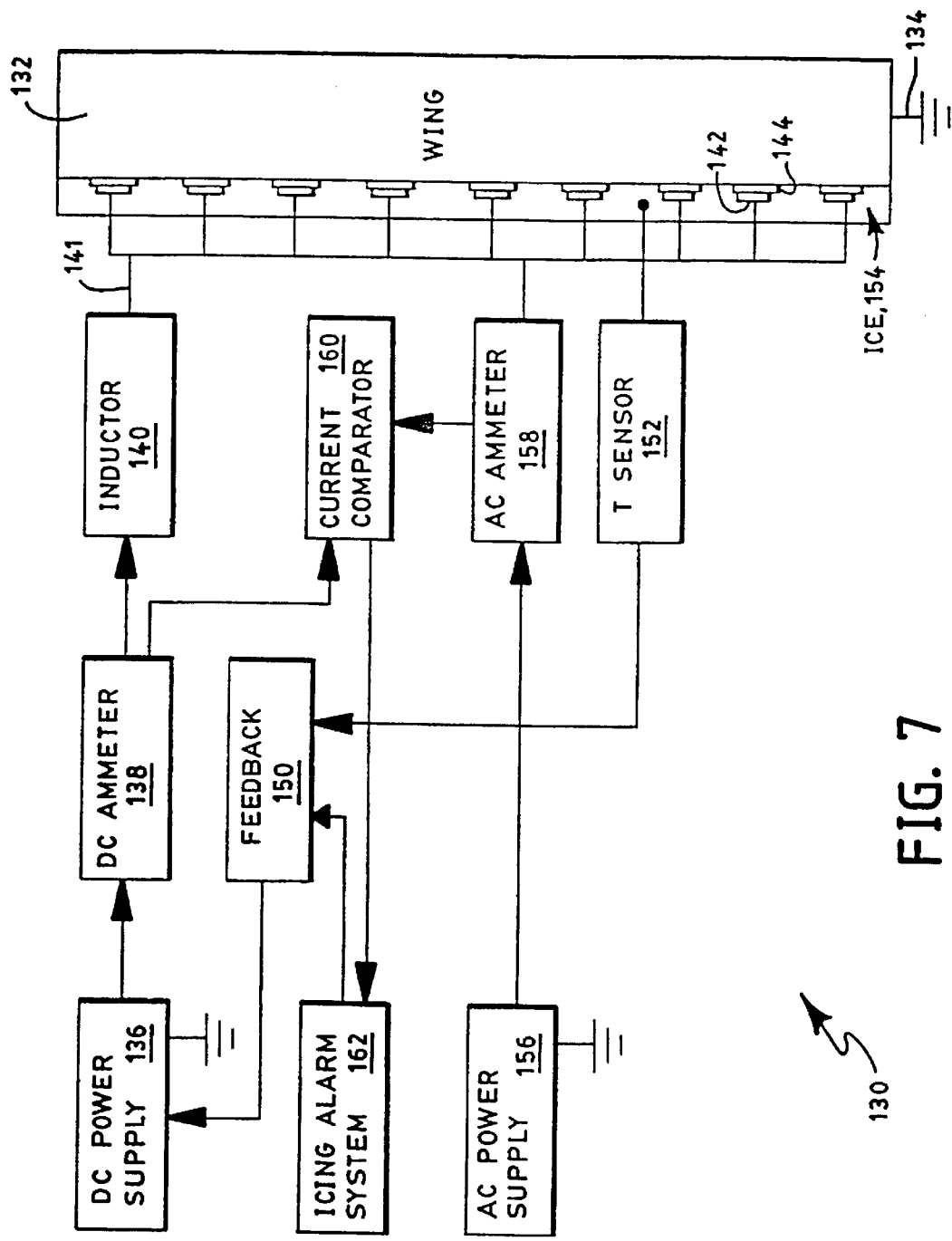
FIG. 7 illustrates one system of the invention for decreasing the ice adhesion strength of ice that forms on an aircraft wing.

FIG. 7 illustrates a system 130 constructed according to the invention. One electrode of the subsystem 130 is the aircraft wing 132. The aircraft wing 132 is electrically coupled to ground 134. A DC power supply 136 is electrically coupled to a DC ammeter 138. The DC ammeter 138 is electrically coupled to an inductor 140. The inductor 140 is electrically coupled through wiring 141 to a conductive paint 142 (or other wing-conformal, conductive equivalent) which is applied to the insulating layer 144 fixed on the aircraft wing 132.

The insulating layer 144 and paint 142 are preferably arranged as a grid pattern, such as described in connection with FIG. 5. The voltage applied between the wing 132 FIG. 7 is generally adjusted to between five and fifty volts, with a corresponding current below 1 A to 100 A per $m^2$ of the grid area, depending on how soon de-icing should occur.

Those skilled in the art should appreciate that a wide variety of commercially available insulating lacquers 144' and conductive paints 142 exist; and that a particular brand should be chosen after testing of icing simulations. Furthermore, the optimal spacing of the grid 145 (i.e., to size the area 114 of FIG. 5) should also be determined experimentally or through analysis for a particular design.

With further reference to FIG. 7, the DC ammeter 138 can additionally couple to a feedback subsystem 150. The feedback subsystem 150 in turn electrically couples to the DC power supply 136 to "control" the DC bias applied to the wing-ice interface, depending upon characteristics such as ice conductivity and temperature. A temperature sensor 152 thus also preferably connects with the circuit 130 to measure the temperature of the ice 154.

Further features of the system 130 can include an AC power supply 156 (operating between about 10 kHz and 100 kHz) electrically coupled to an AC ammeter 158, which in turn electrically couples to the conductive paint 142. A current comparator 160 is electrically coupled to both the AC ammeter 158 and the DC ammeter 138.

An icing alarm subsystem 162 can also be included with the system 130. The current comparator 160 can for example couple to the icing alarm subsystem 144 and to the feedback subsystem 150 so as to initiate certain events, such as discussed below.

The DC ammeter can be used to measure the DC conductivity of the circuit 130. The DC conductivity signal measurement is provided to the feedback subsystem 150, which in turn regulates the current supplied by the DC power supply 136, and to the current comparator 160.

The AC ammeter can be used to measure the AC conductivity of the circuit 130 within the applied frequency range of 10–100 kHz, for example. The AC conductivity signal measurement is provided to the current comparator 160 (and optionally to the feedback 150 for A/D and data processing). A comparison between the AC and DC conductivities is used by the system 130 to distinguish between water and ice, both of which "short" and complete the circuit. Specifically, the ratio of the AC to DC conductivity is 2–3 orders of magnitude greater in the case of ice as compared to water, providing a signal measurement which readily distinguishes ice over water.

As ice forms on the wing 132, therefore, the current comparator 160 signals the feedback subsystem 150 which in turn commands the DC power supply 136 to increase or decrease the DC bias at the ice-wing interface. The DC bias is selected at a magnitude (generally between one and six volts) so as to minimize ice adhesion strength of the ice 154 on the wing 132.

Upon deicing of the wing 132, the signal differential received by the current comparator 160 drops below a preset value; and the current comparator 160 deactivates the icing alarm 162. Simultaneously, the current comparator 160 signals the feedback subsystem 150 which in turn commands the DC power supply 136 to decrease the bias to the initial level.

In summary, the ammeters 138 and 158 are used to determine conductivity of the material which shorts between the grid electrode 142 and the wing 132. As shown, that material is ice 154. The system 130 thus distinguishes between ice and water in an automatic manner. The inductor 140 prevents AC voltage from entering the "DC" parts of the circuit, which should be accurately controlled to modify the ice adhesion strength. The feedback subsystem 150 can and preferably does include a microprocessor and memory to command and control the power supply 136 at a near-optimum DC bias based upon feedback data such as ice temperature and ice conductivity (and/or ice purity). The feedback circuitry preferably increases or decreases DC bias voltages at a level that provides a density of about 0.1 mA/cm² (or about 1 mA/in² current density at the ice-wing interface) after receiving an ice alarm signal from the subsystem 162. Accordingly, for a current of about 10–30 A, a total energy consumption of about 100–500 watts is required for a typical large airplane.

The "DC" parts of the circuit of FIG. 7 thus primarily operate to provide DC bias to the ice-wing interface, and, secondarily (if desired) to measure the DC conductivity of the ice 154. The "AC" parts of the circuit of FIG. 7 thus primarily operate to measure the AC conductivity. The remaining portions of the circuit of FIG. 7 thus provide: (a) an inductor to prevent signal coupling between the DC and AC parts; (b) feedback and measurement and control circuitry to control the applied DC bias based upon detection of ice (as compared to water) and/or measured feedback parameters such as ice temperature and conductivity.

Figure 8:
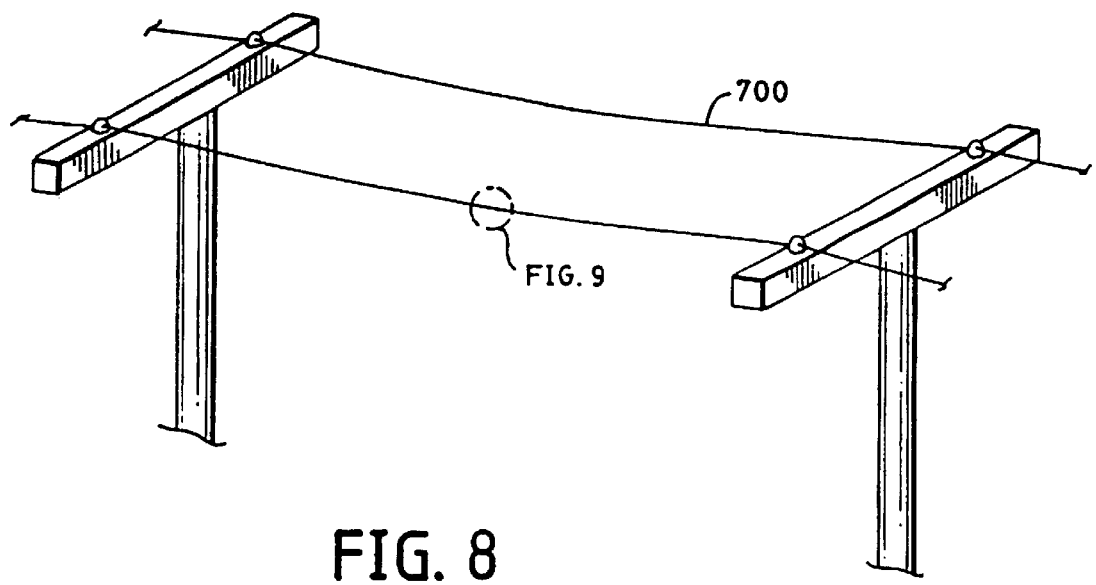
FIG. 8 illustrates one system of the invention for removing ice and snow from power lines through application of a coating on the power line.
Figure 9:
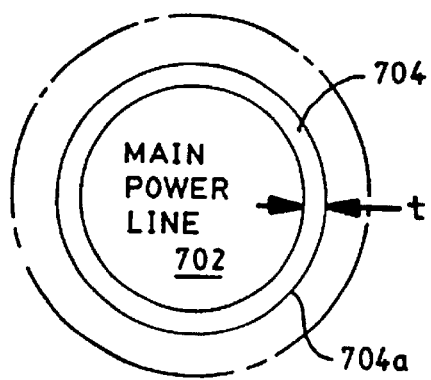
FIG. 9 illustrates application of a ferroelectric coating onto a non-active surface, in accord with the invention, to remove ice therefrom.

FIG. 8 shows one preferred embodiment of the invention suitable to reduce or remove ice from power lines 700. The inset to FIG. 9 shows a cross-sectional view of the power line 700 constructed according to the invention. As known in the art, the normal power line 702 generates power at 60 Hz but with very high E-fields such as 10,000 volts per inch. In accord with the invention, a coating 704 is applied over the line 702 at a thickness of "t".

In one embodiment, the coating 704 is a ferroelectric material, as known in the art. Ferroelectric materials are essentially ceramics that exhibit a very high dielectric constant (e.g., 10,000) and very high dielectric loss (e.g., tan δ≅10) at certain conditions, and a relatively low dielectric constant (3–5) and small dielectric loss at other conditions. One condition that can change the constant is temperature. In a preferred aspect, the material is selected so that above freezing, the dielectric constant is low, and below freezing temperatures, the constant is high. When ambient temperature drops below the freezing point, the coating is intensively heated by the AC electric field due to the high dielectric constant and dielectric loss.

Those skilled in the art should appreciate that the above-described embodiment can be self-regulating in keeping the coating temperature close to (or slightly above) the melting point. If the coating is overheated by the power line's electric field, it automatically undergoes a phase transformation from the ferroelectric to the normal state, at which point the coating stops absorbing the electric field energy. By choosing a phase transition temperature, therefore, the coating temperature can be adjusted per user needs and per the environmental conditions of the local area.

The coating 704 generates heat in the presence of an AC field such as generated by the line 702. Specifically, it exhibits hysteresis that generates heat over the AC cycle; and the coating thus generates heat due to the oscillating E-field of the line 702.

The thickness "t" is typically on the order of one to ten millimeters, though other thicknesses can be applied depending upon coating materials and desired heating. By changing the thickness, for example, temperatures at the surface 704a can be increased by 1–10 degrees, or more. The thickness "t" is chosen so that a desired amount of heat is generated (i.e., heat sufficient to generally melt ice and snow on the surface 704a of the line 700).

When the coating exhibits low dielectric constant and loss (i.e., when the coating is above "freezing" or some other desired temperature), much less heat is generated by the coating 704 and, thereby, much less energy is expended by the line 702.

The coating 704 can also be constructed by ferromagnetic materials with the same or similar effect. In this case, the coating absorbs the energy of the magnetic field generated by a power line.

More particularly, when a ferroelectric material is placed in an oscillating electric field (AC), the material is heated by the field due to a dielectric loss. The heating power per cubic meter is:

$$W = \frac{\omega \epsilon' \epsilon_0}{4\pi} \tan\delta(\overline{E^2}) \qquad (12)$$

where $\epsilon'$ is a relative dielectric permittivity (usually $\epsilon'$ is approximately $10^4$ for typical ferroelectrics), $\epsilon_0$ is a dielectric permittivity of free space ($\epsilon_0$=8.85E−12 F/m), ω is an angular frequency of the AC field (ω=2πf, where f is a usual frequency for the power line, e.g., 60 Hz in conservative power lines), tan δ is the tangent of dielectric loss, and $(\overline{E^2})$ is the average of electric field squared.

Ferroelectrics are characterized with very large values of $\epsilon'$ and tan δ below the so-called Curie Temperature, $T_c$, and small $\epsilon'$ and tan δ above $T_c$. Thus, the dielectric loss (or heating power of the AC electric field) is very high below and close to $T_c$; and it drops by a large factor (e.g., $10^6$) above that temperature. This makes ferroelectrics with $T_c$ close to or just above the melting temperature an optimum choice for a coating 704 such as described above. Such coatings absorb the electric power when the outside temperatures drop below the melting point, $T_m$, and are heated by the field to a temperature above $T_m$ so that they again transform into usual insulators (i.e., no longer absorbing the electric field in significant quantity).

Accordingly, when such coatings are placed in an AC field, the ferroelectric material maintains a constant temperature which is close to $T_c$ and just above $T_m$. This self-adjusting mechanism to prevent icing is very economic: the maximum heating power per one meter of the power line, or per m² at any surface to be protected, can be increased or decreased by changing the coating thickness and/or by adding a neutral (not ferroelectric) insulating paint or plastic to the coating. Examples of suitable ferroelectric materials according to the invention include:

TABLE 3

Ferroelectric materials

| Name | Formula | $T_c$ (Kelvin) |
|---|---|---|
| Rochelle salt | $NaKC_4H_4O_6 \cdot 4H_2O$ | 255–297 |
| Deuterated Rochelle salt | $NaKC_4H_2 D_2O_6 \cdot 4H_2O$ | 251–308 |
| TGSe | $(NH_2CH_2COOH)_3 \cdot H2Se)4$ | 295 |
| Potassium tantalate niobate | $KT_{a1/3} N_{b1/3} O_3$ | 271 |
| Antimonium nitrate | $NH_4NO_3$ | 255, 305 |
| | $Pb_3MgNb_2O_g$ | ~273 K (0 degrees C.) |

By way of example, consider the heating power calculations for $Pb_3MgNb_2Og$. In this example, a middle range power line is considered with $$\sqrt{\overline{V^2}} = 10 \text{ kV}$$

and with a wire diameter of 1 cm=2*radius. The electric field strength on the wire surface is:

$$E \approx \frac{V}{\ln\left(\frac{L}{r}\right) * r} \approx 3 \times 10^5 \, \frac{V}{m} \quad (13)$$

or 3 kV/cm, where L is the distance between the wires (L=1 m). Substitution as above, i.e., $\overline{E^2}$=3E5 V/m, $\omega=2\pi*60$ Hz, $\in'=104$ and tan $\delta=10$, computes to W (1 mm, 60 Hz)=4.5E5 watts/m³. A 1 mm thick film, for example, thus generates 450 watt/m², which is more than sufficient for typical melting of ice.

When applied to power lines, the maximum power that can be dissipated in the coating is limited by a capacitance $C_2$ between the wires:

$$W_{max} \frac{\omega C_2}{2} \cdot \overline{V^2} \quad (14)$$

For wires of 2 cm thickness, with 1 m distance between wires, $C_2 \cong 1.21E-11$ F/m. For a power line at V=350 kV, $W_{max} \cong 300$ Watt/m, which is sufficient energy to keep a 1 m long cable free of ice.

In addition to ferroelectrics, almost any semiconductor coating will provide similar effects. To reach the maximum performance of Equation (24), the coating dielectric conductivity $\sigma$ should satisfy the condition:

$$\sigma \approx \in \in_0 \omega \quad (15)$$

where $\in$ is the coating's dielectric constant, and $\in_0$ is that of free space. For a 60 Hz line and $\in \approx 10$, $\sigma \approx 3.4E-8$ (ohm.m)$^{-1}$. Such conductivity is very typical for many undoped semiconductors and low-quality insulators. Thus, such a coating is not expensive (certain paints qualify for these coatings). Moreover, the same temperature "tuning"—described above—can be achieved due to a strong temperature dependence of conductivity of semiconductor materials (e.g., an exponential dependence). Thus, the optimal conditions according to Equation (22) are satisfied only in a narrow temperature interval, e.g., $-10°$ C.$\leq T \leq 10°$ C., where the coating will melt ice, otherwise consuming little power.

Those skilled in the art should appreciate that other surfaces such as described herein can also be treated with these coatings. For example, applying such a coating to an airplane wing will also provide melting capability by subjecting the coating to AC and, particularly, by increasing that AC as in Equation (19) above. By way of example, for $Pb_3MgNb_2O_g$, a frequency of 100 kHz will heat a 1 mm thick coating to W(1 mm, 100 kHz, 3E5 V/m)=750 kWatt/m².

The invention thus attains the objects set forth above, among those apparent from preceding description. Since certain changes may be made in the above apparatus and methods without departing from the scope of the invention, it is intended that all matter contained in the above description or shown in the accompanying drawing be interpreted as illustrative and not in a limiting sense.

For example, those skilled in the art should appreciate that grid electrodes such as described in connection with FIG. 5 can also be applied to surfaces including the roof of a house, oil pipelines, driveways, and other areas prone to ice collection.

Figure 10:
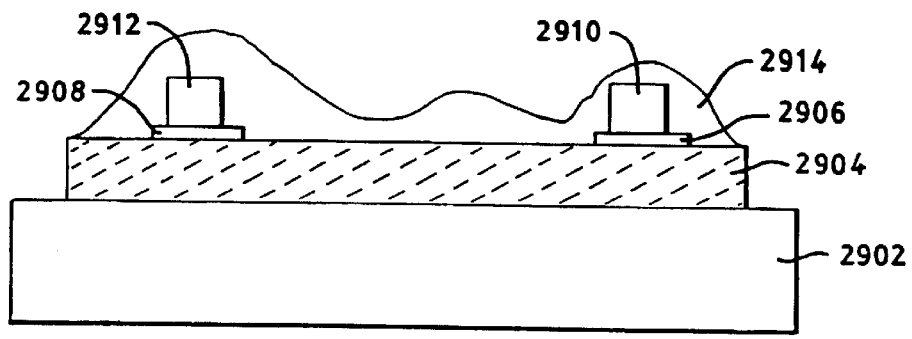
FIG. 10 shows a porous layer constructed according to the invention so as to release ions into ice to facilitate reduction in ice adhesion.

FIG. 10 depicts an illustration of one embodiment of the invention for utilizing a porous layer. A porous layer 2904 of material is attached to a surface 2902. A first insulating layer 2906 and a second insulating layer 2908 are attached to the porous layer 2904 of the material. A first electrode 2910 is attached to the first insulating layer 2906. A second electrode 2912 is attached to the second insulating layer 2908. Ice 2914 covers the porous layer 2904 of material, the first insulating layer 2906, the second insulating layer 2908, the first electrode 2910, and the second electrode 2912.

The porous layer 2904 of material could be any material that has pores that can be doped to release ions into the ice 2914. The material of the porous layer 2904 could be any porous ceramic, metal or alloy. In some embodiments, the porous layer 2904 could be a very thin layer, which is nearly insolvable with respect to water, such a coat of paint covering the surface 2902. Some examples of the material of the porous layer 2904 are:

(1) percolated porous electrodes composed of sintered metal; see, Vilar et al., *Percolated porous electrodes composed of sintered metal—Hydrodynamics and mass transfer, Canadian Journal Of Chemical Engineering*, 76:(1):41–50(1998), which is incorporated herein by reference;

(2) porous graphite-intercalation system for rechargeable batteries; see, Barsukov, *Porous Graphite-Intercalation System For Rechargeable Batteries, New Materials: Conjugated Double Bond Systems*, 191: 265–268 (1995); which is incorporated herein by reference; and (3) porous iron electrodes containing metal additives; see, Jayalakshmi et al., *Electrochemical Characterization Of Porous Iron Electrodes, Proceedings Of The Indian Academy Of Sciences-Chemical Sciences*, 103:(6): 753–761 (1991), which is incorporated herein by reference.

The porous layer 2904 of material is saturated with a water solution of dopants that enhance electrical conductivity. These dopants could be alkali, acids or salts. Some examples are electrolyte solutions of KOH, HF, NaCl, and KCl. When the porous layer 2904 of material comes into contact with the ice 2914 or supercooled water droplets, the porous layer 2904 releases a small amount of the dopants to the ice 2914. The dopants dopes the ice 2914 with ions. The ice's conductivity is then enhanced because of the presence of the dopants. In very cold, high altitude conditions such as in aircraft travel, ice is very pure and/or non-conductive. To enhance electrical conductivity of pure ice and of ice at very low temperature, the operation of the porous layer 2904 provides the missing conductivity. The porous layer 2904 may be refilled with dopants by reapplying the water solution of dopants to the porous layer 2904.

The first electrode 2910 and the second electrode 2912 could be any electrode that voltage is applied to in order to carry electrical current. In one embodiment of the invention, the first electrode and the second electrode are porous in nature and release dopants to the ice 2914 as described with the porous layer 2904. In other embodiments of the invention, the first electrode 2910 and the second electrode 2912 can be configured into any shape such as a grid. These embodiments are not shown in FIG. 29 for the sake of clarity. The first insulating layer 2906 and the second insulating layer could be any material that keeps the first electrode 2910 and the second electrode 2912 from shorting with the porous layer 2904.

In operation, a voltage is applied to the first electrode 2910 and the second electrode 2912. The first insulating layer 2906 and the second insulating layer 2908 prevent the first electrode 2910 and the second electrode 2912 from shorting with the porous layer 2904. The ice 2914 begins to form on the porous layer 2904. The porous layer 2904 releases the dopants to the ice 2914, which improves the ice's 2914 conductivity. The voltage applied from the first electrode 2910 and the second electrode 2912 reduces the ice adhesion of the ice 2914 and melts the ice 2914.

Figure 11:
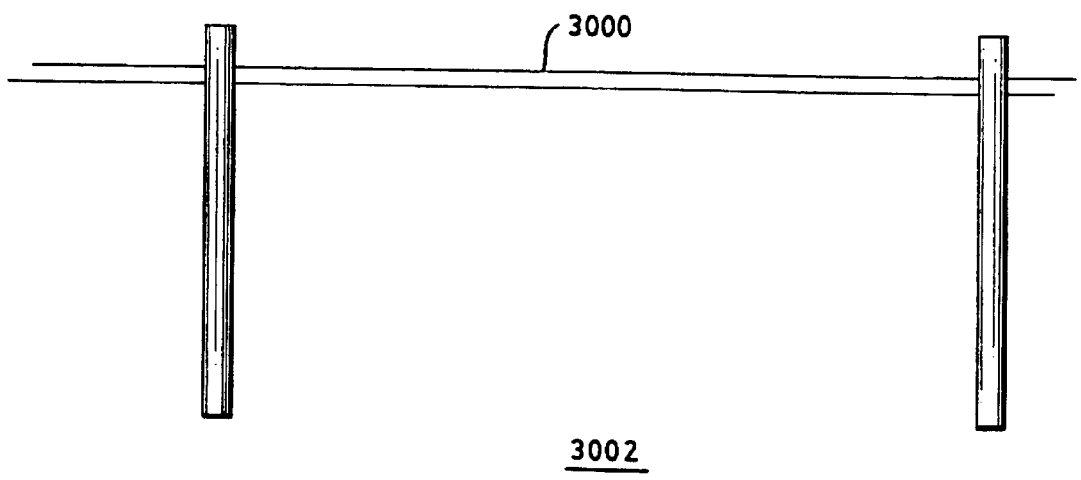
FIG. 11 shows additional detail of a power line constructed according to the invention.

FIG. 11 depicts an illustration of one embodiment of the invention for removing ice from a power line 3000. The power line 3000 is suspended above a ground 3002. The power line 3000 is coated with a ferroelectric, ferromagnetic or semiconductive coating that has a suitable temperature dependence of the dielectric or magnetic loss. When the temperature reaches this activation temperature, the coating of the power line removes ice by reducing ice adhesion.

The power line 3000 passes electrical current, which creates an E-field or magnetic field. The coating of the power line 3000 reacts to the E-field or the magnetic field when the temperature reaches the power line 3000 coating's activation temperature. The coating of the power line 3000 removes any ice that forms on the power line 3000 based on the fields from the electrical current and the coating's properties.

Figure 12:
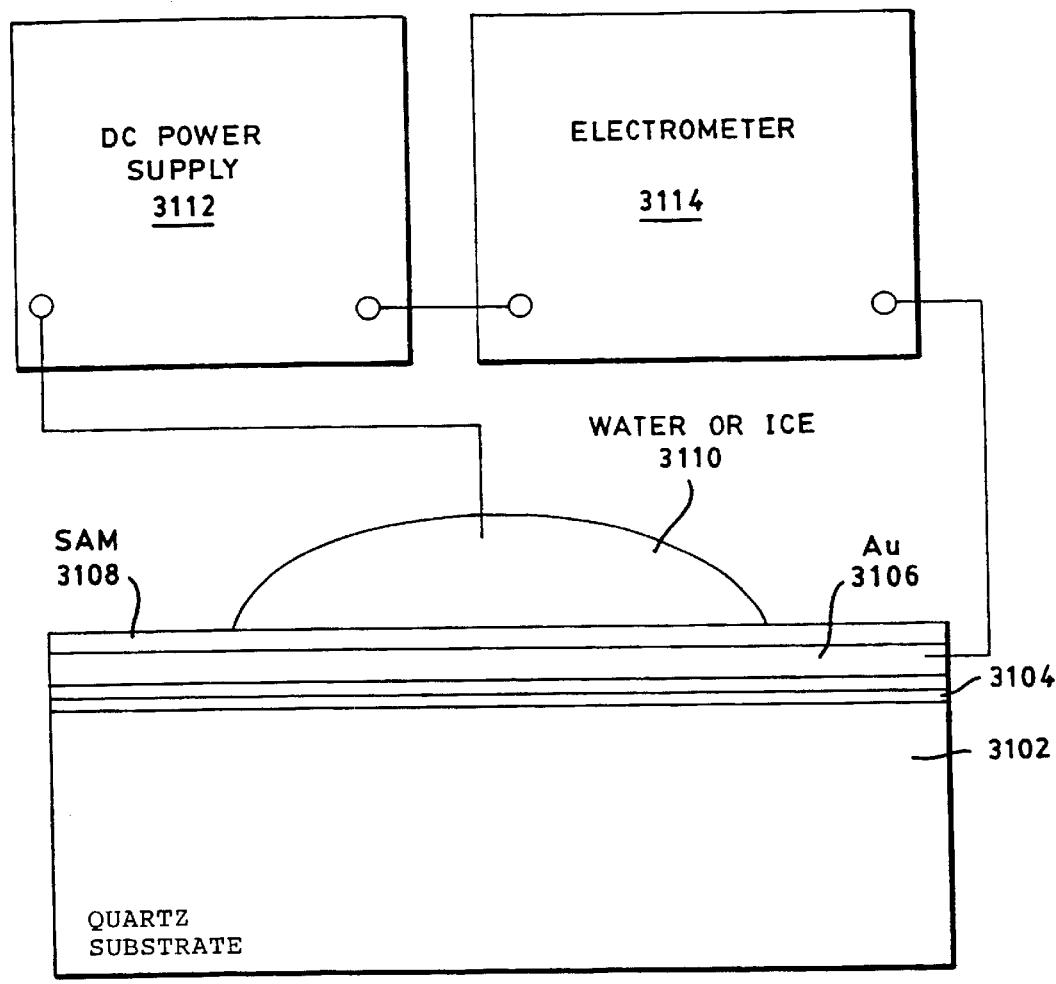
FIG. 12 shows a self assembling monolayer constructed according to the invention to facilitate reduction of ice adhesion to surfaces.

FIG. 12 depicts an embodiment of the invention for ice on a Self Assembling Monolayer. A quartz substrate 3102 is attached to a chrome layer 3104. The chrome layer 3104 is attached to a gold layer 3106. The gold layer 3106 is attached to a Self Assembling Monolayer (SAM) 3108. A drop 3110 of water or ice is on top of the SAM 3108. A DC power supply 3112 is attached to the drop 3110 and an electrometer 3114. The electrometer 3114 is attached to the gold layer 3106.

The electrometer 3114 measures the interfacial charge density by operating in coulomb-meter mode while the DC bias of the DC power supply 3112 and the hydrophobic properties of the SAM 3108 varies. Without an external DC voltage applied, the contact angle of the water with the hydrophobic SAM 3108 is between 98 degrees and 104 degrees. The contact angle of the water with the hydrophilic SAM 3108 is between 36 degrees to 38 degrees. With varying hydrophobic and hydrophilic properties, the work of adhesion of the water to the SAM 3108 is from 130 mJ/m2 to 54 mJ/m2.

With a −4.5 V applied, the contact angle of the water with the hydrophobic SAM 3108 is 40 degrees. The work of adhesion of the water to the SAM 3108 is from 59.5 mJ/m2 to 127 mJ/m2.

The preparation of the SAM 3108 uses gold-plated optical mirrors. For hydrophobic samples, a 1 mM stock solution of reagants is prepared from 1 dodecanethiol [$CH_3(CH_2)_{11}SH$] by dissolving the 138.8 μL dodecanethiol in 1 L of either methanol or ethanol. For hydrophilic samples, a 1 mM stock solution of reagants is prepared from 11-mercapto-1-undecanol [$HO(CH_2)_{11}SH$] by dissolving the 0.2044 g μL 11-mercapto-1-undecanol in 1 L of methanol. To prepare the SAM 3108 with certain hydrophobic and hydrophilic properties, the two solutions are mixed in the ratio of interest.

To prepare the SAM 3108, the gold layer 3106 is rinsed with ethanol and then dried with a stream of nitrogen. The gold layer 3106 is then immersed for 12–36 hours within the appropriate solution described above for the specific hydrophobic and hydrophilic properties. The gold layer 3106 is then removed from the solution and rinsed 5–10 times in ethanol. The gold layer 3106 is dried under a stream of nitrogen for 10–15 seconds.

In view of the foregoing, what is claimed is:

1. A system for modifying ice adhesion strength of ice adhered to an object, comprising an electrode electrically insulated from the object, a DC source coupled to the object and the electrode to generate a DC bias to an interface between the ice and the object, the electrode having a porous material for doping the ice to increase ice conductivity, the DC bias having a voltage which modifies the ice adhesion strength selectively as compared to the ice adhesion strength with substantially zero bias voltage at the interface.

2. A system according to claim 1, further comprising an electrically insulating material disposed between the object and the electrode, the material having substantially the same shape as the electrode.

3. A system according to claim 1, wherein the electrode comprises a grid electrode shaped to conform to a surface of the object, each point of the grid electrode being in electrical contact with the source.

4. A system according to claim 4, further comprising a grid insulator disposed between the object and the grid electrode.

5. A system according to claim 1, further comprising a DC ammeter connected in circuit with the electrode and source for determining a DC conductivity of the ice.

6. A system according to claim 5, further comprising a AC source and AC ammeter connected in circuit with the electrode and source for determining an AC conductivity of the ice.

7. A system according to claim 6, wherein the AC source generates one or more frequencies between about 10 kHz to 100 kHz.

8. A system according to claim 6, further comprising a current comparator, coupled to the DC and AC ammeters, for generating a signal representative of a ratio between the DC and AC conductivities.

9. A system according to claim 8, further comprising a feedback subsystem to assess the signal and to determine whether ice or water shorts the circuit between the electrode and the object.

10. A system according to claim 9, further comprising a temperature sensor constructed and arranged to measure ice temperature and for transmitting a signal representative of ice temperature to the feedback subsystem.

11. A system according to claim 9, further comprising an icing alarm which activates the system upon detecting ice corresponding to a pre-set value of AC to DC ice conductivities.

12. A system for modifying ice adhesion strength of ice adhered to an object, comprising: an electrode electrically insulated from the object, a DC source coupled to the object and the electrode to generate a DC bias to an interface between the ice and the object, a porous material disposed over at least part of the object to increase ice conductivity, the DC bias having a voltage which modifies the ice adhesion strength selectively as compared to the ice adhesion strength with substantially zero bias voltage at the interface.

13. A system according to claims 1 or 12, wherein the object comprises a self assembling monolayer, the monolayer having varying hydrophobic and hydrophilic properties to modify the adhesion of ice to the object.

* * * * *